United States Patent
Oetken

(10) Patent No.: US 10,787,198 B2
(45) Date of Patent: Sep. 29, 2020

(54) CONTROLLING COMPACTOR TURNING RADIUS

(71) Applicant: Caterpillar Paving Products Inc., Brooklyn Park, MN (US)

(72) Inventor: Nicholas A. Oetken, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 106 days.

(21) Appl. No.: 16/160,600

(22) Filed: Oct. 15, 2018

(65) Prior Publication Data

US 2020/0114957 A1 Apr. 16, 2020

(51) Int. Cl.
| | |
|---|---|
| *G05D 1/00* | (2006.01) |
| *B62D 6/00* | (2006.01) |
| *E01C 23/01* | (2006.01) |
| *E01C 19/26* | (2006.01) |
| *E02D 3/02* | (2006.01) |

(52) U.S. Cl.
CPC .............. *B62D 6/001* (2013.01); *E01C 19/26* (2013.01); *E01C 23/01* (2013.01); *E02D 3/02* (2013.01)

(58) Field of Classification Search
None
See application file for complete search history.

(56) References Cited

U.S. PATENT DOCUMENTS

| | | | |
|---|---|---|---|
| 5,489,006 A | 2/1996 | Saiia et al. | |
| 5,942,679 A * | 8/1999 | Sandstrom | .............. E01C 19/26 404/133.05 |
| 6,431,790 B1 * | 8/2002 | Anderegg | .............. E01C 19/288 366/116 |
| 6,749,364 B1 * | 6/2004 | Baker | .............. E01C 19/288 404/118 |
| 7,810,887 B2 | 10/2010 | Hjerth et al. | |
| 7,886,864 B2 * | 2/2011 | Potts | .............. B62D 6/007 180/402 |
| 8,019,514 B2 | 9/2011 | Yuet et al. | |
| 8,818,699 B2 | 8/2014 | Nichols et al. | |
| 9,367,042 B2 * | 6/2016 | Oetken | .............. E01C 19/288 |
| 9,476,168 B2 * | 10/2016 | Oetken | .............. E01C 19/002 |
| 9,550,522 B2 | 1/2017 | Oetken et al. | |
| 9,650,062 B2 * | 5/2017 | Schulenberg | .......... G08C 17/02 |
| 9,952,115 B2 | 4/2018 | Landes et al. | |

(Continued)

FOREIGN PATENT DOCUMENTS

CN 103675320 8/2015

*Primary Examiner* — Jonathan M Dager
(74) *Attorney, Agent, or Firm* — Schwegman, Lundberg & Woessner

(57) ABSTRACT

A compactor can optionally include a steering system configured to direct the movement of the compactor, a temperature sensor configured to generate data indicative of a temperature of a material that forms a surface of the compacting area, and a controller coupled to the machine and communicatively coupled to the temperature sensor. The controller can be configured to: receive data indicative of the temperature of the material from the temperature sensor, determine if the temperature exceeds a first threshold temperature, and if the temperature of the compactor exceeds the first threshold temperature, control the steering system to limit a turning angle to a predetermined value such that a turning radius of the compactor is increased.

20 Claims, 6 Drawing Sheets

(56) References Cited

U.S. PATENT DOCUMENTS

| | | | |
|---|---|---|---|
| 9,982,397 B2* | 5/2018 | Korb | E02D 3/02 |
| 10,006,175 B2* | 6/2018 | Bornemann | E01C 19/26 |
| 2006/0034660 A1* | 2/2006 | Satzler | E01C 19/236 |
| | | | 404/124 |
| 2008/0063473 A1* | 3/2008 | Congdon | E01C 19/288 |
| | | | 404/75 |
| 2008/0260462 A1* | 10/2008 | Ackermann | E01C 19/288 |
| | | | 404/124 |
| 2008/0267707 A1* | 10/2008 | Potts | E01C 19/288 |
| | | | 404/117 |
| 2009/0142133 A1* | 6/2009 | Glee | E01C 19/004 |
| | | | 404/75 |
| 2010/0172696 A1* | 7/2010 | Commuri | E01C 19/288 |
| | | | 404/117 |
| 2013/0051930 A1* | 2/2013 | Marsolek | E01C 19/286 |
| | | | 405/271 |
| 2013/0136539 A1* | 5/2013 | Aardema | G01K 1/14 |
| | | | 404/75 |
| 2013/0261895 A1* | 10/2013 | Dabbs | B62D 11/003 |
| | | | 701/41 |
| 2013/0261998 A1* | 10/2013 | Anderegg | E01C 19/288 |
| | | | 702/56 |
| 2014/0086684 A1* | 3/2014 | Sehr | G01J 5/047 |
| | | | 404/84.05 |
| 2016/0109858 A1* | 4/2016 | Oetken | E01C 19/288 |
| | | | 404/84.05 |
| 2016/0244091 A1* | 8/2016 | Oetken | E01C 19/42 |
| 2016/0298308 A1* | 10/2016 | Oetken | E01C 19/288 |
| 2017/0284036 A1* | 10/2017 | Rio | E01C 19/288 |
| 2019/0106846 A1* | 4/2019 | Marsolek | E01C 23/07 |
| 2019/0337517 A1* | 11/2019 | Anderson | F16H 61/0213 |
| 2019/0347000 A1* | 11/2019 | Marsolek | E01C 19/48 |
| 2020/0050192 A1* | 2/2020 | O'Donnell | G05D 1/0293 |
| 2020/0114962 A1* | 4/2020 | Oetken | B62D 6/02 |

* cited by examiner

CONTROLLING COMPACTOR TURNING RADIUS

TECHNICAL FIELD

The present application relates to working machines, and in particular, compactors.

BACKGROUND

Compactors have been developed for soil compaction as well as asphalt compaction. The present application is applicable to both such contexts and is applicable to all compactors.

In a paving context, a paving machine distributes hot paving material over a surface such as a road or parking lot. One or more compactors follow the paving machine to compact the material to a desired density and obtain an acceptable surface finish. Most commonly, the compacting process is performed with double drum compactors and pneumatic tire compactors. Double drum compactors, having a front drum and a back drum, which serve to propel the machine and compact the asphalt to a suitable state via the weight of the compactor and in some instances a vibratory eccentric weight within the drum. Pneumatic tire compactors, having a front set of tires and a rear set of tires, which serve to propel machine and compact the asphalt to a suitable state via the weight of the compactor. Completing compaction can often require multiple passes across the asphalt mat with a compactor.

Compaction of a construction material is recognized as being important for improving the stability of the material in construction operations such as soils and asphalt pavement. By compacting the surface, soil strength and stability can be increased to the magnitude required by the design. State Highway Agencies and contractors are concerned about quality control of the quality and/or extent of compaction of various types of terrains.

SUMMARY

In an example, a system for control of a movement of a compactor within a compacting area is disclosed. The system can comprise a steering system configured to direct the movement of the compactor, a temperature sensor configured to generate data indicative of a temperature of a material that forms a surface of the compacting area, and a controller communicatively coupled to the temperature sensor. The controller can be configured to: receive data indicative of the temperature of the material from the temperature sensor, determine if the temperature exceeds a threshold temperature, and if the temperature of the compactor exceeds the first threshold temperature, control the steering system to limit a turning angle to a predetermined value such that a turning radius of the compactor is increased.

In another example, a compactor is disclosed. The compactor can comprise a steering system configured to direct the movement of the compactor, a temperature sensor configured to generate data indicative of a temperature of a material that forms a surface of the compacting area, and a controller coupled to the machine and communicatively coupled to the temperature sensor. The controller can be configured to: receive data indicative of the temperature of the material from the temperature sensor, determine if the temperature exceeds a first threshold temperature, and if the temperature of the compactor exceeds the first threshold temperature, control the steering system to limit a turning angle to a predetermined value such that a turning radius of the compactor is increased.

In yet a further example, a method for control of a movement of a compactor within a compacting area is disclosed. The method can comprise directing the movement of the compactor with a steering system, sensing one or more operational criteria of the compactor including a temperature of a material that forms a surface of the compacting area, determining if the temperature of the material exceeds a threshold temperature, and controlling the steering system to limit a turning angle to a predetermined value if the temperature exceeds the threshold temperature.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

In FIG. 3A, a first turn is depicted that is tighter than that of FIG. 3B, and therefore, has a relatively lower turning radius than that of FIG. 3B. FIG. 3B schematically depicts the compactor performing a second turn that is more gradual having a larger turning radius than that of FIG. 3A.

DETAILED DESCRIPTION

With compactors, turning overly sharply (i.e. with a steering angle of a high degree resulting in a low turning radius) while performing compaction can cause damage to a surface of the material (e.g., soil, asphalt, etc.) being compacted. Such damage can be due to a ground speed differential and a resulting applied force differential across the drum width during the turn. Examples of such ground speed differential are discussed in reference to FIGS. 4A and 4B herein. The ground speed differential can be exerted on the surface by the drum(s) as the applied force differential. The damage caused looks like excessive tearing and material movement. This damage has a negative impact on quality control, project completion timeframe and other project related aspects.

Past solutions to addressing this ground speed differential have included providing for a divided drum, commonly referred to a split drum. However, such solution is not effective in all instances and can be costly.

In view of the foregoing problems, the present application recognizes this type of damage can be due to multiple factors but primarily can be the result of the material being compacted to form the surface being at an undesirably high temperature for the applied steering angle. Other factors related to such damage are also recognized and can include the properties of the material being compacted (e.g., a type, density, etc. of asphalt or soil) and drum properties (e.g. a drum width).

Figure 1:
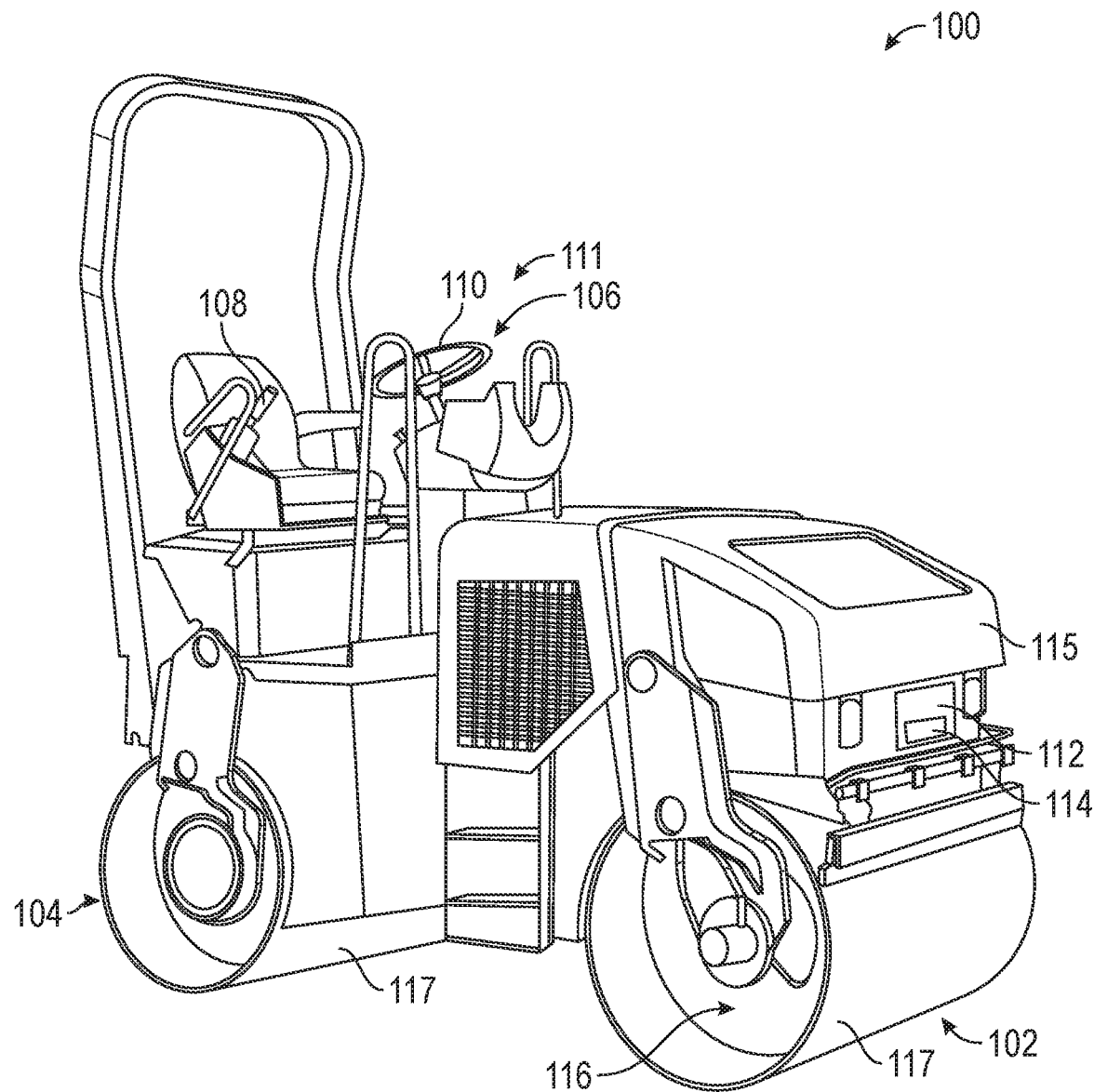
FIG. 1 depicts an example compactor in accordance with this disclosure.

Referring to FIG. 1, a compactor 100 is shown according to one example of the present disclosure. The compactor 100 is illustrated as a self-propelled double drum compactor having a front drum 102 and a back drum 104. However, it should be recognized that the various systems, methods and techniques disclosed herein are applicable to any type of compactor and are not limited to the type shown in FIG. 1.

The compactor 100 includes an operator station 106 which may be equipped with various systems and mechanisms for control of the operating of the compactor 100. The compactor 100 therefore can include a drive system 108 (indicated to include a shift lever), a steering system 110 (indicated to include a steering wheel) and an operational controller 111, The drive system 108 can additionally include an engine 112 and a generator 114 coupled with the engine 112, which can be attached to a frame 115 of the compactor 100. The generator 114 can serve as an electrical power source for various onboard systems and components, including the operational controller 111. The engine 112 can comprise any type of engine (internal combustion, gas, diesel, gaseous fuel, natural gas, propane, etc.), can be of any size, with any number of cylinders, and in any configuration. The engine 112 can be configured to drive movement of the compactor 100 and can also drive other components such as the generator 114. According to some examples the engine 112 can comprise an electric motor.

Construction of one example of the operational controller 111 will be discussed further in reference to FIG. 5 below. The operational controller 111 can include a processor and a memory component. The processor may be a microprocessor or other processor as known in the art. The operational controller 111 is configured to communicate with and control various systems and components as described herein.

The steering system 110 can include various mechanisms and devices not specifically shown but known in the art. For example, the steering system 110 can include a friction device in communication with the operational controller 111 and configured to create resistance to movement by the operator of the steering wheel. Friction devices are well known in the art and can create resistance mechanically, electrically, by use of a variable viscosity fluid, or the like. Similarly, the steering system 110 can include a steering control valve in communication with the operational controller 111. The steering control valve can be configured to receive processed steering input from the operational controller 111 and, based on that input, to steer the compactor 100 by controlling the angular movement of the drums 102, 104.

The steering system 110 can be configured to receive operator steering input. As is further discussed herein, the steering system 110 can alternatively or additionally be configured to be controlled automatically by the operational controller 111 in some examples. Thus, the steering system 110 can be communicatively coupled for communication with the operational controller 111. In some examples, the steering system 110 can be configured to transmit the operator steering input to the operational controller 111 for processing.

Similarly, the drive system 108 can be configured to receive operator input such as to increase or decrease a speed of the compactor 100. As is further discussed herein, the drive system 108 can alternatively or additionally be configured to be controlled automatically by the operational controller 111 in some examples. Thus, the drive system 110 can be communicatively coupled for communication with the operational controller 111. In some examples, the drive system 110 can be configured to transmit the operator input to the operational controller 111 for processing.

In yet further examples, the compactor 100 can have a braking system 116 configured to receive operator input to decrease or arrest a speed of the compactor 100. The braking system 116 can alternatively or additionally be configured to be controlled automatically by the operational controller 111 in some examples. Thus, the braking system 116 can be communicatively coupled for communication with the operational controller 111.

As discussed above, it should be appreciated that the compactor 100 is illustrative only and a wide variety of the compactors 100 can be designed and/or controlled in accordance with the present disclosure. For example, rather than a double drum compactor, the compactor 100 might include only a single drum and can utilize some other type of compacting element. For instance, the front compacting element might be a drum, and the back compacting element could be a pneumatic compacting element. Compactors with a split drum are also contemplated. Moreover, the compactor 100 might comprise a tow-behind or pushed compacting apparatus. The operator station 106 might also be dispensed with in versions where the compactor 100 is operated in an autonomous fashion and a remote control or self-guidance system is used. As is further discussed herein, the systems, methods and techniques can control of a movement of the compactor 100 within a compacting area.

Specific to the compactor 100 of FIG. 1, each of the front drum 102 and the back drum 104 includes a drum surface 117 for compacting asphalt. The drum surface 117 may comprise a cylindrical, smooth metallic surface comprising the exterior of a shell of the front and back drums 102 and 104. As the compactor 100 is passed across an asphalt mat to compact it, the drum surface 117 will roll against an asphalt mat laid by a paver (not shown). As a result, the asphalt of the mat will increase in density and develop a relatively smooth surface finish.

Figure 2:
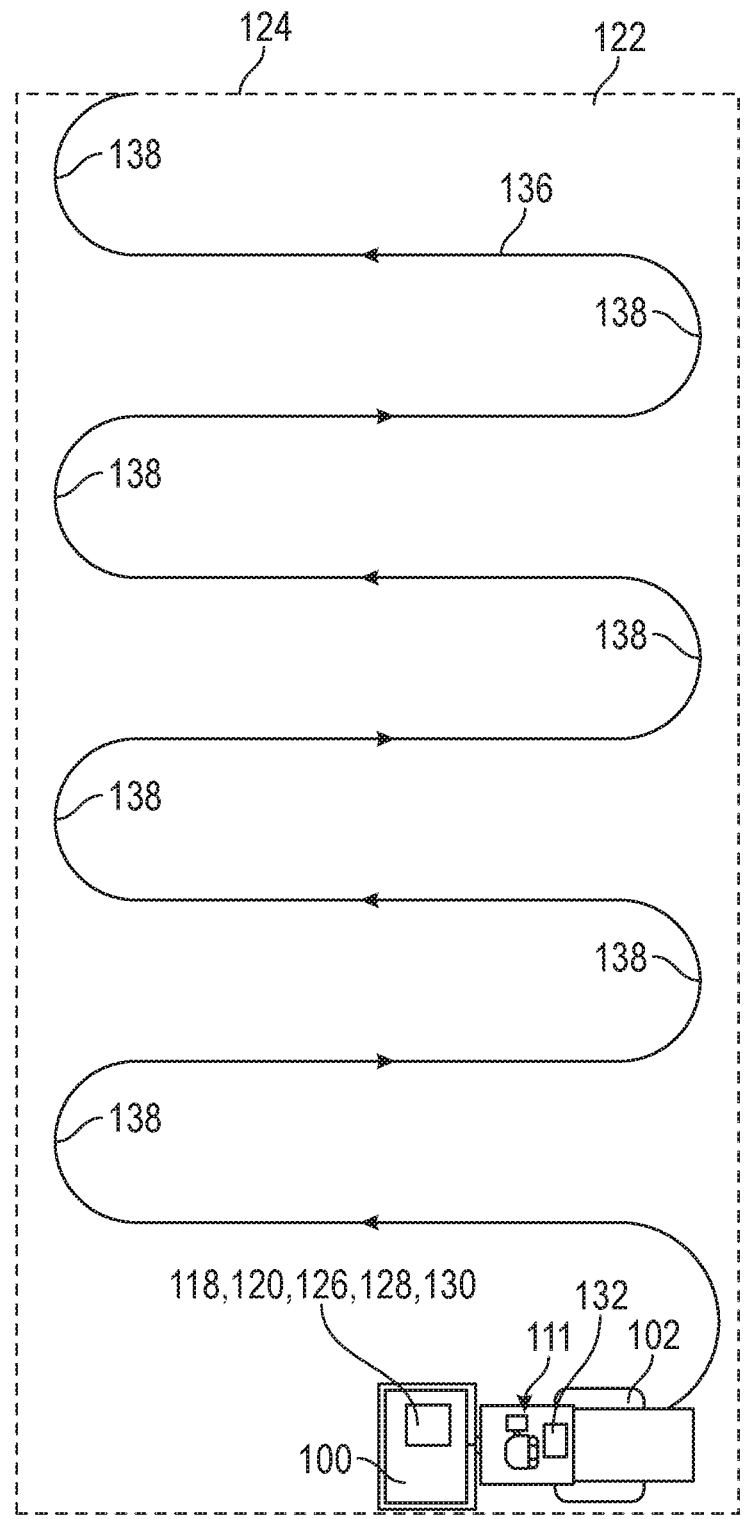
FIG. 2 is a schematic diagram of the compactor of FIG. 1 operating within a compacting area.

As shown now specifically in reference to FIG. 2, one or more sensors 118 can be mounted to the compactor 100. The operational controller 111 can be coupled to the compactor 100 and communicatively coupled to the one or more sensors 118. In some examples, at least one of the one or more sensors 118 can be remote from the compactor 100 such as a camera or other visual detection device placed adjacent the compactor 100 in or adjacent a compacting area 124 (shown schematically by dashed lines). The one or more sensors 118 can be configured to generate data indicative of operational criteria of the compactor 100 (as used herein the term "operational criteria" includes data about physical conditions of the compacting area 124) and send the data as signals to the operational controller 111, which can be configured to receive such signals/data. The one or more sensors 118 can include a temperature sensor 120 configured to measure a temperature of a construction material that forms a surface 122 of the compacting area 124 as further shown in FIG. 2. Further sensors can also be used in some examples. Such further sensors can include, for example, a compaction sensor 126 configured to measure a density and/or modulus of the construction material that forms the surface 122, a moisture sensor 128 configured to sense a moisture content such as of soil within the compacting area 124, and/or a steering sensor 130. According to one example the temperature sensor 120 can be a visual sensor such as an infra-red sensor(s) configured to deliver real-time data based on readings to the operational controller 111 and/or the operator. In some cases, the temperature sensor 120 can comprise two infra-red sensors mounted on the front and rear of the compactor 100. The data from the sensors can provided for temperature mapping, a visual readout of mat temperature in order to keep the compactor 100 in the proper temperature range (e.g., avoid tender-zones that can occur in the range of 104°-110° C. (219°-230° F.) temperature range). The compaction sensor 126 can comprise an accelerometer or another type of sensor that can be used as part of a compaction system as variously described in U.S. Patent Application Serial Nos. US2012/0107045A1 and US20140348587A1, co-owned by the applicant, the entire contents of which are incorporated in their entireties.

The steering sensor 130 can be mounted on the compactor 100 and can be configured to measure steering angle, movement, steering speed, or rate of movement, of the steering wheel (not shown) by the operator. The steering sensor 130 can comprise magnetic reed switch(es), Hall Effect sensor(s), accelerometer(s), and magnetometer, among other example rotary/orientation sensors, for example. The steering sensor 130 can be in electronic communication with the operational controller 111 and can be configured to transmit data to the operational controller 111 indicative of the measured data (e.g., steering angle, movement, steering speed, rate of movement, other data relevant to steering, etc.). Steering speed is the rate at which the steering wheel is turned or moved by the operator in order to turn the drums (only front drum 102 is shown in FIG. 2) of the compactor 100. In an embodiment in which a steering wheel is utilized, the steering speed may be the rate at which the steering wheel is rotated by the operator. In an embodiment with a joystick rather than a steering wheel, the steering speed may be the rate at which a joystick may be pushed or pulled by the operator to turn the drums of the compactor 100 as it moves.

In some examples, the compactor 100 can include an input/display device 132 that can be used to monitor, display and/or input data to the operational controller 111. For example, such data can include data gathered by the one or more sensors 118 regarding operating criteria (e.g., the temperature of the asphalt or soil derived from the temperature sensor 120, the density and/or modulus of the asphalt or soil that forms the surface 122 derived from the compaction sensor 126, the moisture content of the soil derived from the moisture sensor 128, etc.). Such data can include further operation related data (factors/criteria) that can be input to the operational controller 111 either manually or automatically. This data can include properties of the material being compacted (e.g., an asphalt type), a drum width (discussed subsequently), a drum width (e.g., single drum or split drum), etc.

In some examples, the data gathered by the one or more sensors 118, specifically regarding the temperature and the density and/or modulus, and the further operation related data (factors/criteria discussed above) including in particular the drum width can be used by the operational controller 111 to select and/or modify algorithm(s) governing the movement including the turning radii of the compactor 100 as further discussed below. For example, with a relatively larger drum width a more conservative (larger) turning radius can be selected and utilized by the operational controller 111 so as to reduce a ground speed differential across the drum width as compared with a situation where a relative smaller drum width is utilized that does not have as large a ground speed differential across the drum width. Similarly, if the asphalt is sensed to be relatively hotter (e.g., above 220 Fahrenheit) a more conservative (larger) turning radius can be selected and utilized by the operational controller 111. In yet a further example, if the density of the construction material is sensed to be relatively lower a more conservative (larger) turning radius can be selected and utilized by the operational controller 111 as opposed to a situation where the density is sensed to be relatively higher.

FIG. 2 shows an operational path 136 of the compactor 100 within the compacting area 124 on the surface 122. The operational path 136 can include a number of turns 138 each having a turning radius as further discussed in reference to FIGS. 3A and 3B.

Figure 3B:
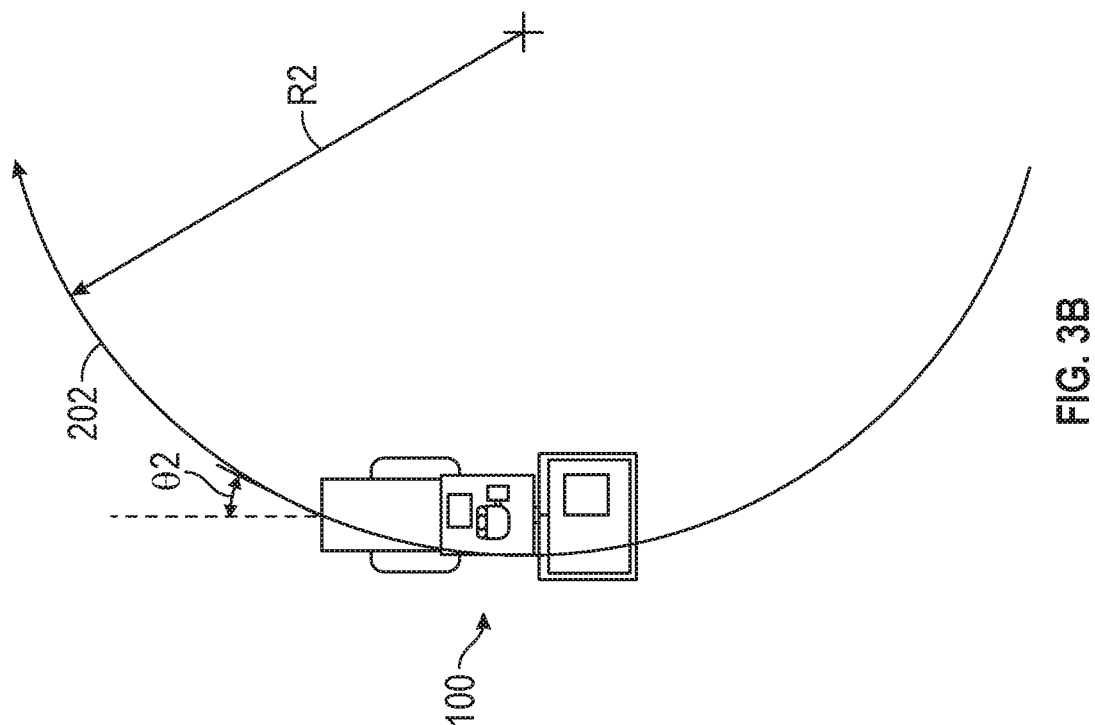
FIGS. 3A and 3B are top plan views of the compactor of FIG. 1 schematically depicting the compactor performing two different turns each having a different turning radius.
Figure 3A:
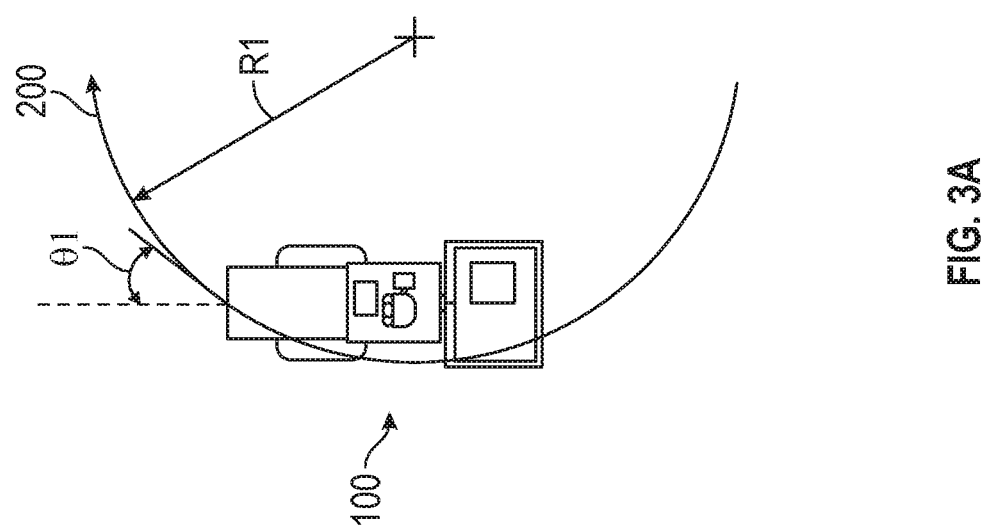

FIGS. 3A and 3B show the compactor 100 performing two different turns each having a different turning radius. FIG. 3A shows a first turn 200 and FIG. 3B shows a second turn 202. In FIG. 3A, the first turn 200 is depicted that is tighter than the second turn 202 of FIG. 3B. Thus, the first turn 200 has a relatively lower turning radius R1 than a turning radius R2 of FIG. 3B. However, the first turn 200 has a larger turning angle θ1 (i.e., having a higher degree) than a turning angle θ2 of FIG. 3B. FIG. 3B schematically depicts the compactor performing the second turn 202 that is more gradual having the smaller turning radius R2 than that of FIG. 3A. The second turn 202 has a smaller turning angle θ2 as compared with the turning angle θ1 of FIG. 3A.

Recall that turning overly sharply (i.e. with a steering angle of a high degree resulting in a low turning radius) while performing compaction can cause damage to a surface of the material (e.g., soil, asphalt, etc.) being compacted. Thus, in some instances it can be desirable to increase the turning radius (and limit the turning angle) as illustrated in FIG. 3B as opposed to using the turning radius illustrated in FIG. 3A.

Figure 4A:
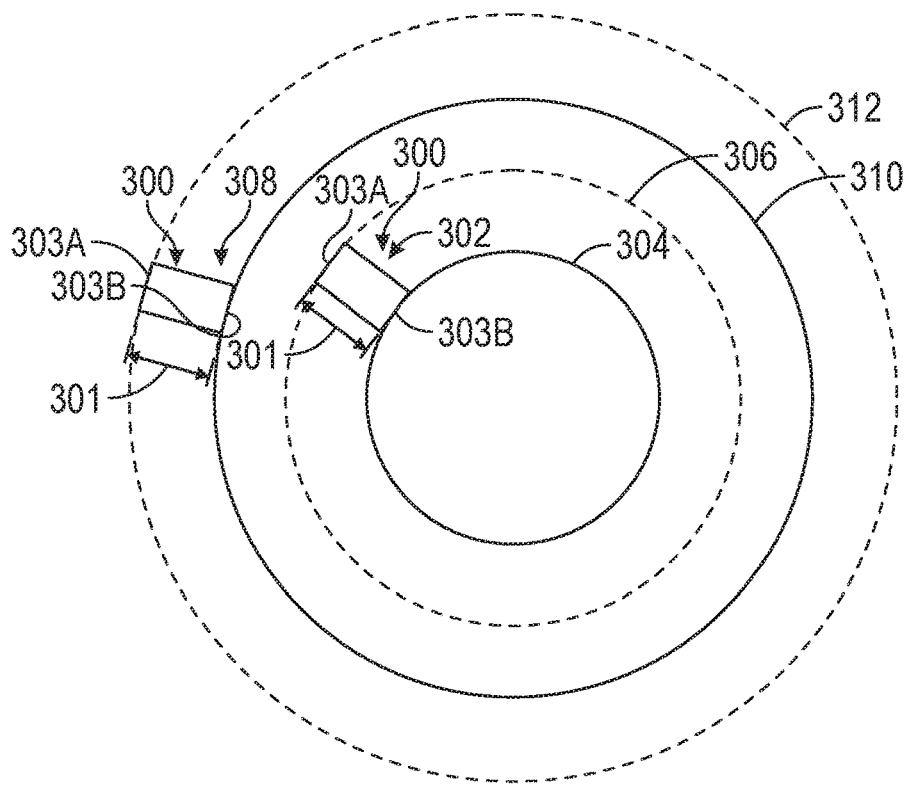
FIG. 4A shows a two meter drum executing two different turns, a first turn with an inner radius of 4 meters and a second turn with an inner radius of 8 meters.

FIG. 4A shows a graphic example of ground speed differentials experienced by a same two meter drum in performing two turns. In particular, the drum 300 having a width 301 can perform a first turn 302 and a second turn 308. The width 301 of the drum is measured from the outer edge 303A to the inner edge 303B. The first turn 302 can have a 4 meter inner turning radius (an inner circumference 304 of the first turn 302 along the inner radius is indicated by the solid inner circle in FIG. 4A). An outer circumference 306 of the first turn 302 along an outer radius is indicated by the dashed inner circle in FIG. 4A. The drum 300 can perform a second turn 308 having an 8 meter inner turning radius (an inner circumference 310 of the second turn 308 along the inner radius is indicated by the solid outer circle in FIG. 4A). An outer circumference 312 of the second turn 308 along an outer radius is indicated by the dashed outer circle in FIG. 4A.

In regards to a calculation of ground speed differential, with the drum 300 having a relatively tighter turn (here demonstrated with the turn 302 having the 4 meter inner turning radius), the inner circumference 304 is $8\pi$ and the outer circumference 306 is $12\pi$. Thus, the outer to inner % difference in circumference (i.e., the relative amount of distance the drum 300 on an outer edge 303A must cover relative to an inner edge 303B) is 50% larger (or 12/8). Similarly, with the drum 300 having a relatively less aggressive turn (here demonstrated with the turn 308 having the 8 meter inner turning radius), the inner circumference 310 is 16π and the outer circumference 312 is 20π. Thus, the outer to inner % difference in circumference (i.e., the relative amount of distance the drum 300 on an outer edge 303A must cover relative to an inner edge 303B) is 25% larger (or 20/16). Thus, for a turn with a larger turning radius the relative ground speed differential across the width 301 of the drum 300 drum is smaller than for a turn with a smaller turning radius.

Figure 4B:
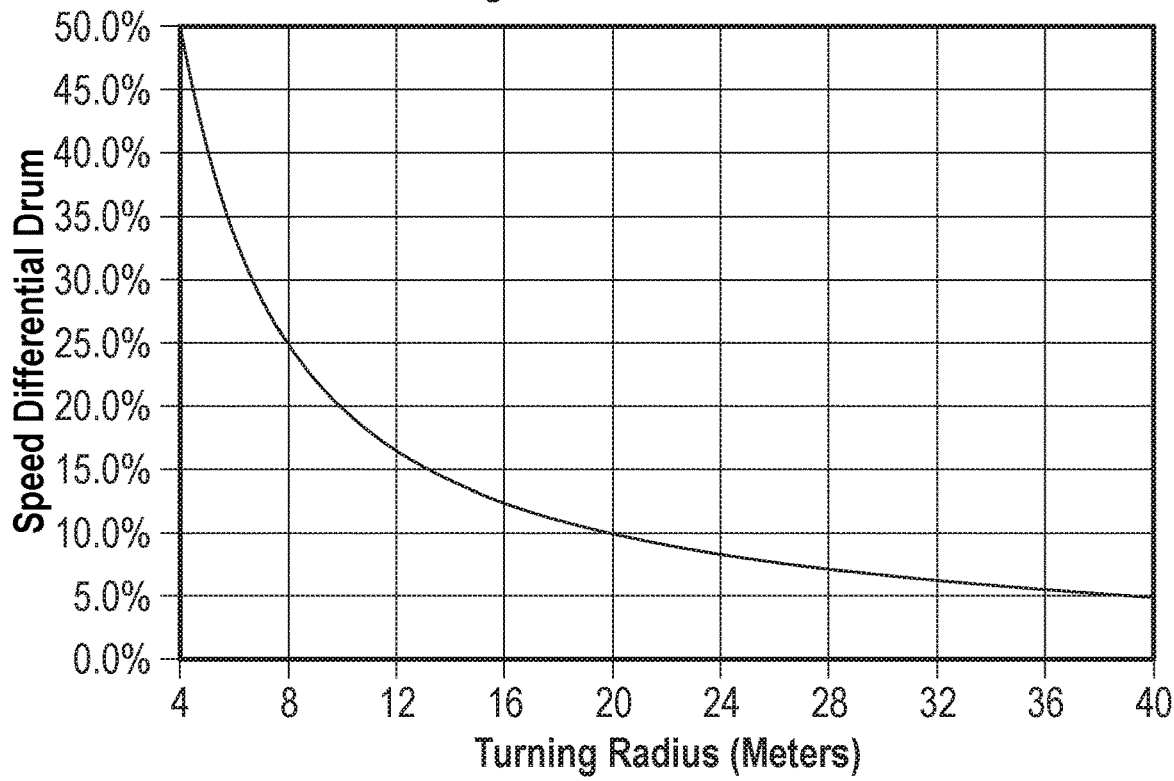
FIG. 4B is a graph of the ground speed differential across the two meter drum of FIG. 4A given different turning radii.

FIG. 4B shows a plot of the ground speed differential across the drum 300 based upon a desired turning radius (i.e. a turning radius that would be executed by an operator if turning angle was not limited by the systems, methods and techniques discussed herein). Recall the drum 300 has the width 301 of two meters. The plot shows that ground speed differential decreases in an exponential manner based upon turning radius. According to one example, if the sensed temperature of the material the forms the surface is 220 Fahrenheit or greater, the ground speed differential can be limited to 8% maximum by limiting the turning radius. According to another example, if the sensed temperature of the material the forms the surface is 160 Fahrenheit, the ground speed differential can be limited to 15% maximum by limiting the turning radius. According to yet a further example, if the sensed temperature of the material the forms the surface is between 160 Fahrenheit and 220 Fahrenheit, the ground speed differential can be linearly limited between 15% and 8% by limiting the turning radius. Thus, for example, if the sensed temperature of the material the forms the surface is 190 Fahrenheit, the ground speed differential can be limited to 11.5% maximum by limiting the turning radius.

Thus, as shown in FIG. 4B, based upon the drum width, the methods, systems, apparatuses disclosed herein can a ground speed differential across the width of the drum based upon the width and a desired turning radius, and if the ground speed differential across the width of the drum of the compactor exceeds a threshold ground speed differential given the temperature, can control the steering system to limit the turning radius to the predetermined value.

Figure 5:
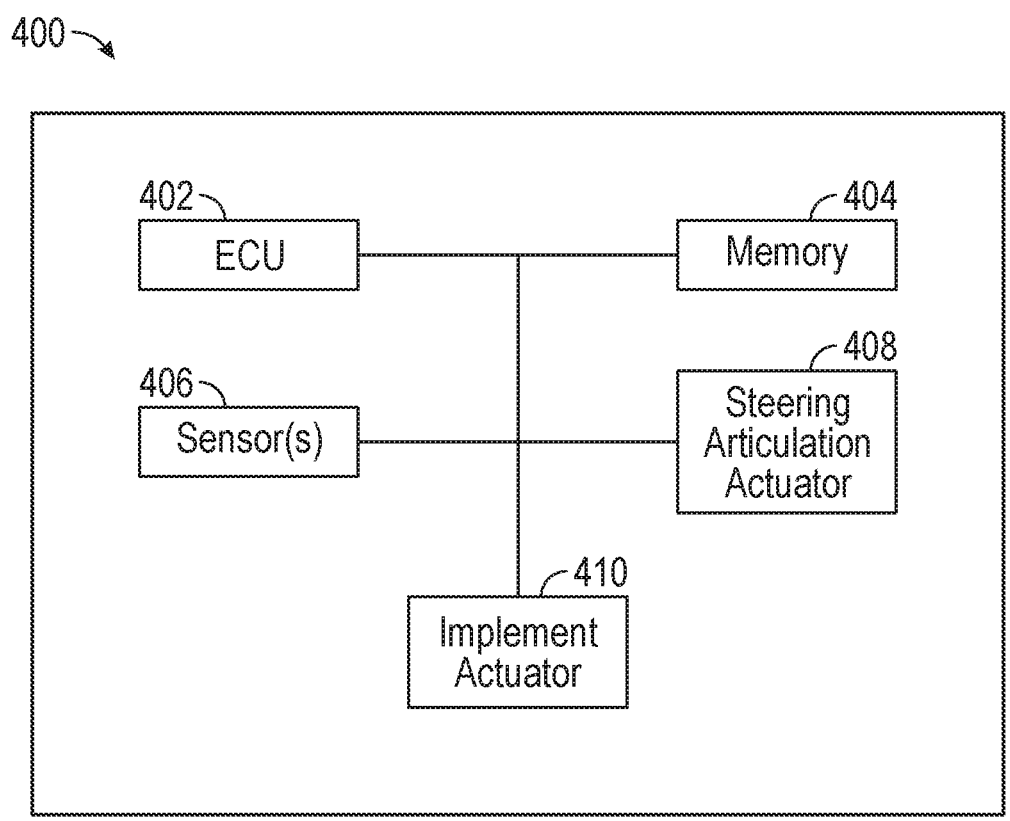
FIG. 5 is a diagram of a system that can be used with the exemplary compactor of FIG. 1 to control the machine movement.

FIG. 5 shows a schematic of a control system 400 that can be utilized with the compactor 100 previously discussed. The control system 400 can include or comprise the operation controller 111 in some examples. The controller 111 can be, as in the example of FIG. 5, an electronic control unit (ECU) 402. In the example of FIG. 5, the ECU 402 can be coupled to the compactor or can be remote therefrom. The control system can include transmitter, receiver, transceiver, and other componentry component (not specifically illustrated) configured to enable ECU 402 to communicate and exchange information, data, signals, as examples, with other systems and/or machines/vehicles.

The control system 400 can be an embedded system that controls machine electrical systems and/or other subsystems of the machine. Types of ECUs include Electronic/engine Control Module, Powertrain Control Module, Transmission Control Module, Brake Control Module, Suspension Control Module, among other examples. In the case of industrial, construction, and other heavy machinery, example ECUs can also include an Implement Control Module associated with one or more implements coupled to and operable from the machine.

The control system 400 and the ECU 402 and other electronic controls of compactor 100, can include software, hardware, and combinations of hardware and software configured to execute a number of functions attributed to the components in the disclosed examples. The ECU 402 or other electronic controls of compactor 100 can be an analog, digital, or combination analog and digital controllers including a number of components. As examples, the ECUs and other electronic controls of compactor 100 can include integrated circuit boards or ICB(s), printed circuit boards PCB(s), processor(s), data storage devices, switches, relays, etc. Examples of processors can include any one or more of a microprocessor, a controller, a digital signal processor (DSP), an application specific integrated circuit (ASIC), a field-programmable gate array (FPGA), or equivalent discrete or integrated logic circuitry.

The control system 400 can include memory 404 (e.g., storage media) to store and/or retrieve data or other information, for example, signals from sensors 408. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of, for example, ECU 402.

The control system 400 including the components shown in FIG. 5 can be configured to communicate with one another and with other components of compactor 100 via various wired or wireless communications technologies and components using various public and/or proprietary standards and/or protocols. Examples of transport mediums and protocols for electronic communication between components of compactor 100 include Ethernet, Transmission Control Protocol/Internet Protocol (TCP/IP), 802.11 or Bluetooth, or other standard or proprietary transport mediums and communication protocols.

According to the example of FIG. 5, the control system 400 can include a steering articulation actuator 408 configured to execute commands of the implement actuator 410. The implement actuator 410 can communicate with all of the ECU 402, memory 404, one or more sensors 406 and steering articulation actuator 408. The steering articulation actuator 408 can couple with the steering system, the drive system, the braking system as previously described in FIG. 1 to control movement of the compactor. For example, the steering articulation actuator 408 can communicate with the steering control valve of the steering system as previously discussed in reference to FIG. 1. Signals from the control system 400 via the steering articulation actuator 408 can control the steering system to execute turns of having a desired turning radius as is further described herein. Thus, the control system 400 implemented in hardware, software, and combinations thereof, can be configured to automatically control movement (e.g., the turning radius, speed) and/or other aspects of the compactor operation without intervention by or interaction from the operator according to some examples.

The control system 400 can be configured, for example, to automatically control the turning radius of the machine when certain conditions (e.g., a certain range of temperature(s) or temperature above a threshold temperate are detected for the asphalt temperature, a ground speed differential across a width of the drum is calculated to be above a threshold ground speed differential, a density and/or modulus of the material the forms a surface of the compacting area is below a predetermined threshold, etc.) are detected. As discussed previously, the control system 400 can be configured to communicate with and receive signals, data, or other information from one or more sensors 406 configured to detect, measure, etc. one or conditions of, factors and/or parameters related to machine operation. The control system 400 can, for example, be configured to receive signals from and can be configured to automatically control movement of the compactor 100 based upon such the one or more sensors 406 (e.g., actuate the steering system to perform a turn having a desired radius of curvature, etc.

The present disclosure recognizes, among other things, that automated machine movement controls, e.g. the same or similar to those discussed above, can be utilized to supplement or limit human operation of the compactor such as in the aspect of making appropriate turns for the compactor to better avoid damage to asphalt, soil, etc.

Thus, according to one example of the present application there is disclosed a system for control of a movement of a compactor within a compacting area is disclosed. The system can comprise a steering system configured to direct the movement of the compactor, a temperature sensor configured to generate data indicative of a temperature of a material that forms a surface of the compacting area, and a controller communicatively coupled to the temperature sensor. The controller can be configured to: receive data indicative of the temperature of the material from the temperature sensor, determine if the temperature exceeds a threshold temperature, and if the temperature of the compactor exceeds the first threshold temperature, control the steering system to limit a turning angle to a predetermined value such that a turning radius of the compactor is increased.

According to further examples, the predetermined value cannot be exceeded by an operator. The predetermined value can additionally be based upon a width of a drum of the compactor in addition to the temperature of the material. The controller can be configured to: based upon the drum width and a desired turning radius, calculate a ground speed differential across the width of the drum, and if the ground speed differential across the width of the drum of the compactor exceeds a threshold ground speed differential given the temperature, control the steering system to limit the turning radius to a second predetermined value.

The ground speed differential across the width of the drum can comprise a first ground speed at a first edge of the drum compared with a second ground speed at a second edge of the drum. The predetermined value can additionally be based upon at least one of a type and a density and/or modulus of the material the forms the surface of the compacting area.

In some examples, a steering sensor can be configured to measure a movement of the steering system within the compacting area. The controller can be configured to receive data indicative of the movement of the steering system from the steering sensor, and the controller can be configured to override such movement of the steering system.

According to a further example, the controller can be configured to control the steering system based upon one or more of: data regarding a width of a drum of the compactor and data regarding type or material properties of the material that forms the surface.

Figure 6:
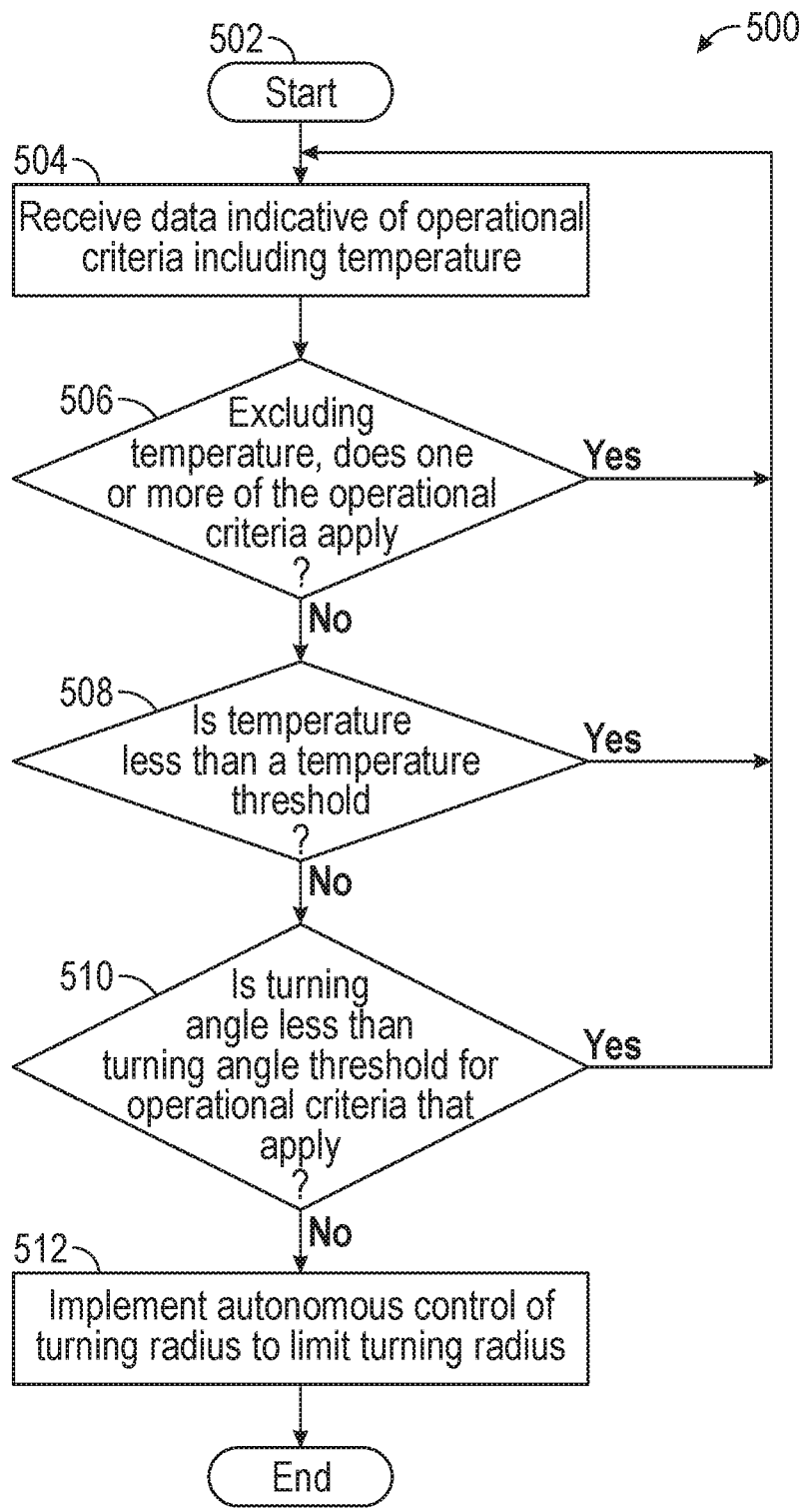
FIG. 6 is a flowchart depicting an example method of operating a compactor in accordance with this disclosure.

FIG. 6 is a flowchart depicting an example method 500 for control of a movement of a compactor within a compacting area in accordance with this disclosure. In FIG. 6, method 500 includes a start 502 and a step 504 of receiving data indicative of operational criteria from one or more sensors. This step 504 can include receiving data regarding a temperature of a construction material what will form a surface of the compacting area. Further data can be gathered as previously discussed including a density and/or modulus of the material the forms the surface of the compacting area. Operational data can include data not received from the one or more sensors. Thus, the operational data can be automatically input, manually input, derived from sensor data, etc. The method 500 proceeds to step 506 where, excluding temperature data, it is determined if the operational factor/criteria should apply. Put another way, should another operational criteria. (e.g., the width of the drum, the type of the material that forms the surface of the compacting area, the density and/or modulus of the material the forms the surface of the compacting area, etc.) factor into the method 500. For example, if stone mastic asphalt (SMA) is utilized this product would better resist damage due to tearing than a finely graded mix. Thus, if SMA is utilized, the method could utilize a more aggressive turning angle than would otherwise be utilized such as in the instance where the asphalt is the finely graded mix. One or more of these operational criteria if of a sufficiently critical nature can act to alter the steering/control algorithms applied in the method 500 and the method 500 would re-start from the start 502 with altered/updated algorithm/logic as indicated. For example, with a relatively larger drum width a more conservative (larger) turning radius can be selected and utilized for the method 500 so as to reduce a ground speed differential across the drum width as compared with a situation where a relative smaller drum width is utilized that does not have as large a ground speed differential across the drum width. Similarly, if the asphalt is sensed to be relatively hotter (e.g., above 150 Fahrenheit) a more conservative (larger) turning radius can be selected and utilized by the method 500. In yet a further example, if the density of the construction material is sensed to be relatively lower a more conservative (larger) turning radius can be selected and utilized by the method 500 as opposed to a situation where the density is sensed to be relatively higher. It should be noted that in some examples step 506 need not be performed before or can be performed after steps 508 or 510, for example.

According to some example, the method 500 at step 508 can determine if the temperature of the material within the compacting area that forms the surface thereof is less than a threshold temperature. According to various examples the threshold temperature can be 150 Fahrenheit, 180 Fahrenheit, 200 Fahrenheit, 220 Fahrenheit, 250 Fahrenheit or a Fahrenheit value between 150 and 250 Fahrenheit, according to one embodiment. However, other values for threshold temperature are possible. If it is determined that the temperature of the material the forms the surface is less than the threshold temperature the turning angle need not be limited the method 500 can re-start. However, if the temperature of the material the forms the surface is determined to exceed the threshold temperature at step 508, the method 500 can proceed to the step 510. At step 510, the method 500 can determine if a turning angle of the compactor based upon the operator input is less than a turning angle threshold for the temperature of the material the forms the surface of the compacting area. If the method 500 determines the operator input for turning angle to be lower than the threshold, the control of method 500 is not implemented in the turn and the method 500 re-starts as shown in FIG. 6. However, if the turning angle of the compactor based upon the operator input is greater than the turning angle threshold, the method 500 can proceed to step 512, where the method 500 can implement an autonomous control of the turning radius to apply a turning angle (and a resulting turning radius for the compactor) of a predetermined value that can be appropriate to the operational criteria. In one example, the method 500 at step 512 can implement an autonomous control of the turning radius to apply the turning angle (and the resulting turning radius for the compactor) of the predetermined value that can be appropriate to the the temperature of the material the forms the surface of the compacting area.

Thus, the method 500 can control of a movement of a compactor within a compacting area. The method 500 can comprise directing the movement of the compactor with a steering system, sensing one or more operational criteria of the compactor including a temperature of a material that forms a surface of the compacting area, determining if the temperature of the material exceeds a threshold temperature, and controlling the steering system to limit a turning angle to a predetermined value if the temperature exceeds the threshold temperature.

According to further examples, the method can further comprise controlling the steering system to limit a turning angle to a second predetermined value additionally based upon a width of a drum of the compactor in addition to the temperature. In some examples, based upon the drum width, the method, can include the steps of: calculating a ground speed differential across the width of the drum based upon the width and a desired turning radius, and if the ground speed differential across the width of the drum of the compactor exceeds a threshold ground speed differential given the temperature, controlling the steering system to limit the turning radius to the predetermined value. In some examples, the method can include controlling the steering system based upon one or more of: data regarding a width of a drum of the compactor and data regarding type or material properties of the material that forms the surface.

INDUSTRIAL APPLICABILITY

The present application discloses compactors that can include controls that are configured to monitor and, in some cases, automatically control various aspects of machine operation including machine movement. In some cases, such compactors can include controls, which, in conjunction with and/or independent of operator control, control aspects of the movement of the machine within the compacting area. Such aspects of machine movement that can be controlled can include but are not limited to machine turning radius within the compacting area. Thus, in the compacting area, machine steering angle can be controlled so as to be limited to a predetermined value. In some cases, based upon one or more of drum width, a surface temperature within the compacting area and/or other physical criteria of the compacting area, so as to be limited with the result that a turning radius of the compactor within the compacting area can be increased as further described herein. In this manner, the compactors disclosed can have a turning radius that is limited to reduce or avoid damaging a surface of the compacting area.

In one specific example, a Caterpillar® CB-10 vibratory asphalt compactor having a solid drum and an operating weight of 20945 lb, drum width of 67 inches and drum diameter of 47 inches is disclosed. The CB-10 compactor is capable of a maximum speed of 12 km/h and is capable of a turning radius of 4.25 m at a turning angle of 36 degrees at maximum or other speeds. However, while on hot asphalt having a temperature between 150 degrees Fahrenheit and 320 degree Fahrenheit, the temperature can be sensed and the turning angle can be limited to 20 degrees. This 20 degrees value can be altered based upon one or more of: different asphalt mixes, a sensed density and/or modulus of the material the forms the surface of the compacting area being relatively higher or lower, etc. It should be noted that the 20 degrees value can be related to the drum width of the CB-10 compactor (here 67 inches). It is important to note that although the CB-10 would otherwise be capable with operator input to have the turning angle of 36 degrees if the disclosed systems, methods and techniques were not applied, with such systems, methods and techniques in place the operator would not be allowed to apply such turning angle on hot asphalt and at the temperature ranges provided. Rather, the turning angle would be automatically limited to the values provided in the example above for the CB-10.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A system for control of a movement of a compactor within a compacting area, the system comprising:
    a steering system configured to direct the movement of the compactor;
    a temperature sensor configured to generate data indicative of a temperature of a material that forms a surface of the compacting area; and
    a controller communicatively coupled to the temperature sensor, the controller configured to:
        receive data indicative of the temperature of the material from the temperature sensor,
        determine if the temperature exceeds a threshold temperature, and
        if the temperature of the material exceeds the first threshold temperature, control the steering system to limit a turning angle to a predetermined value such that a turning radius of the compactor is increased.

2. The system of claim 1, wherein the predetermined value cannot be exceeded by an operator.

3. The system of claim 1, wherein the predetermined value is additionally based upon a width of a drum of the compactor in addition to the temperature of the material.

4. The system of claim 3, wherein the controller is configured to:
    based upon the width of the drum and a desired turning radius, calculate a ground speed differential across the width of the drum; and
    if the ground speed differential across the width of the drum of the compactor exceeds a threshold ground speed differential given the temperature, control the steering system to limit the turning radius to a second predetermined value.

5. The system of claim 4, wherein the ground speed differential across the width of the drum comprises a first ground speed at a first edge of the drum compared with a second ground speed at a second edge of the drum.

6. The system of claim 3, wherein the predetermined value is additionally based upon at least one of a type and a density and/or modulus of the material the forms the surface of the compacting area.

7. The system of claim 1, further comprising a steering sensor configured to measure a movement of the steering system within the compacting area.

8. The system of claim 7, wherein the controller is configured to receive data indicative of the movement of the steering system from the steering sensor, and wherein the controller is configured to override such movement of the steering system.

9. The system of claim 1, wherein the controller is configured to control the steering system based upon one or more of: data regarding a width of a drum of the compactor and data regarding type or material properties of the material that forms the surface.

10. A compactor comprising:
 a steering system configured to direct the movement of the compactor;
 a temperature sensor configured to generate data indicative of a temperature of a material that forms a surface of a compacting area; and
 a controller coupled to the machine and communicatively coupled to the temperature sensor, the controller configured to:
  receive data indicative of the temperature of the material from the temperature sensor,
  determine if the temperature exceeds a first threshold temperature, and
  if the temperature of the material exceeds the first threshold temperature, control the steering system to limit a turning angle to a predetermined value such that a turning radius of the compactor is increased.

11. The compactor of claim 10, wherein the predetermined value cannot be exceeded by an operator.

12. The compactor or claim 10, wherein the predetermined value is additionally based upon a width of a drum of the compactor in addition to the temperature.

13. The compactor of claim 12, wherein the controller is configured to:
 based upon the width of the drum and a desired turning radius, calculate a ground speed differential across the width of the drum; and
 if the ground speed differential across the width of the drum of the compactor exceeds a threshold ground speed differential given the temperature, control the steering system to limit the turning radius to a second predetermined value.

14. The compactor of claim 13, wherein the ground speed differential across the width of the drum comprises a first ground speed at a first edge of the drum compared with a second ground speed at a second edge of the drum.

15. The compactor of claim 12, is additionally based upon at least one of a type and a density and/or modulus of the material the forms the surface of the compacting area.

16. The compactor of claim 10, wherein the controller is configured to control the steering system based upon one or more of: data regarding a width of a drum of the compactor and data regarding type or material properties of the material that forms the surface.

17. A method for control of a movement of a compactor within a compacting area, the method comprising:
 directing the movement of the compactor with a steering system;
 sensing one or more operational criteria of the compactor including a temperature of a material that forms a surface of the compacting area;
 determining if the temperature of the material exceeds a threshold temperature; and
 controlling the steering system to limit a turning angle to a predetermined value if the temperature exceeds the threshold temperature.

18. The method of claim 17, further comprising controlling the steering system to limit a turning angle to a second predetermined value additionally based upon a width of a drum of the compactor in addition to the temperature.

19. The method of claim 18, wherein based upon the drum width, the method, includes the steps of:
 calculating a ground speed differential across the width of the drum based upon the width and a desired turning radius; and
 if the ground speed differential across the width of the drum of the compactor exceeds a threshold ground speed differential given the temperature, controlling the steering system to limit the turning radius to the predetermined value.

20. The method of claim 17, wherein controlling the steering system is additionally based upon one or more of: data regarding a width of a drum of the compactor and data regarding type or material properties of the material that forms the surface.

* * * * *